United States Patent
Rajesh et al.

(10) Patent No.: US 10,971,990 B1
(45) Date of Patent: Apr. 6, 2021

(54) AVOIDING FALSE NSN DETECTION IN FLYBACK CONVERTERS

(71) Applicant: Cypress Semiconductor Corporation, San Jose, CA (US)

(72) Inventors: Karri Rajesh, Visakhapatnam (IN); Arun Khamesra, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/704,975

(22) Filed: Dec. 5, 2019

Related U.S. Application Data (60) Provisional application No. 62/902,537, filed on Sep. 19, 2019.

(51) Int. Cl.
*H02M 3/335* (2006.01)
*H02M 1/08* (2006.01)

(52) U.S. Cl.
CPC ......... *H02M 1/08* (2013.01); *H02M 3/33523* (2013.01); *H02M 3/33592* (2013.01)

(58) Field of Classification Search
CPC ................................................ H02M 3/33592
USPC ........................................... 363/21.06, 21.14
See application file for complete search history.

(56) References Cited

U.S. PATENT DOCUMENTS

| | | | | |
|---|---|---|---|---|
| 9,479,067 B2* | 10/2016 | Gong | ................ | H02M 3/33592 |
| 2010/0027298 A1* | 2/2010 | Cohen | ................ | H02M 3/33592 |
| | | | | 363/21.14 |
| 2015/0023062 A1* | 1/2015 | Hyugaji | ............ | H02M 3/33569 |
| | | | | 363/16 |
| 2015/0280573 A1 | 10/2015 | Gong et al. | | |
| 2016/0359421 A1 | 12/2016 | Lin et al. | | |
| 2017/0033698 A1* | 2/2017 | Vemuri | ............ | H02M 3/33523 |
| 2017/0279363 A1* | 9/2017 | Hagino | .................. | H02M 1/08 |
| 2017/0288440 A1* | 10/2017 | Ye | ..................... | H02M 3/33592 |
| 2017/0310225 A1 | 10/2017 | Balakrishnan et al. | | |
| 2018/0159434 A1 | 6/2018 | Werner et al. | | |
| 2018/0358902 A1 | 12/2018 | Duvnjak | | |

OTHER PUBLICATIONS

Diodes Inc, "Secondary Side Synchronous Rectification Controller", DS38010 Rev. 5-2 APR345, Jun. 2016; 11 pages.
Leadtrend, "Synchronous Rectification Drive with Green Mode Function", LD8521-DS-00, Jul. 28, 2016; 14 pages.

(Continued)

*Primary Examiner* — Gary A Nash (57) ABSTRACT

Techniques for avoiding false negative sense (NSN) detection in a flyback AC-DC converter are described herein. In an example embodiment, a secondary side controller of the AC-DC converter comprises a frequency detector, a negative sense detector, and control logic. The frequency detector is configured to determine a frequency of an input signal from the drain node of a synchronous rectifier (SR) circuit on the secondary side of the AC-DC converter. The negative sense detector is configured to determine a negative voltage of the input signal. The control logic is configured to: enable the negative sense detector, when the frequency of the input signal rises above a frequency threshold value; and turn on the SR circuit to transfer power to the secondary side of the AC-DC converter, when the negative voltage of the input signal falls below a voltage threshold value.

20 Claims, 8 Drawing Sheets

(56) References Cited

OTHER PUBLICATIONS

International Search Report for International Application No. PCT/US2020/49922 dated Nov. 30, 2020; 2 pages.
Written Opinion of the International Searching Authority, for International Application No. PCT/US2020/049922 dated Nov. 30, 2020; 5 pages.

* cited by examiner

AVOIDING FALSE NSN DETECTION IN FLYBACK CONVERTERS

PRIORITY

This application claims the priority and benefit of U.S. Provisional Application No. 62/902,537, filed on Sep. 19, 2019, which is incorporated by reference herein in its entirety.

TECHNICAL FIELD

This disclosure relates to flyback AC-DC converters.

BACKGROUND

AC-DC converters convert power from an alternating current (AC) source to a direct current (DC) at a specified voltage level. Generally, an AC-DC converter transfers power from an AC input coupled to a primary side of a transformer to a DC output coupled to a secondary side of the transformer. Some AC-DC converters operate in Discontinuous Conduction Mode (DCM). In a DCM mode, a converter stores power in its transformer during an on-cycle of the primary (e.g., AC) side, while the secondary (e.g., DC) side is off; the converter transfers the stored power during the following on-cycle of the secondary side, while the primary side is off.

A major problem for converters operating in DCM mode is false negative sense (NSN) detection. False NSN detection happens when resonant ringing on the primary side of the converter is wrongly interpreted by the secondary side controller as a signal to turn on the secondary PS-FET to transfer of power to the secondary side. However, if the secondary side is turned on while the primary side is still on, then cross-conduction may cause very high secondary-side current that can cause breakdown of secondary-side transistors and diodes. Conventionally, blanking time (e.g., blanking NSN detection for a certain time interval) may be used as a solution to this problem. Blanking time, however, may not solve the problem completely and decreases the efficiency of the converter due to unnecessary and untimely turn-on of the secondary side since power would be transferred through the rectifier diode instead of the secondary PS-FET during such blanking time thereby causing power loss.

DETAILED DESCRIPTION

The following description sets forth numerous specific details such as examples of specific systems, components, methods, and so forth, in order to provide a good understanding of various embodiments of the techniques described herein for avoiding false negative sense (NSN) detection in flyback converters. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, step, operation, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples", are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Figure 1:
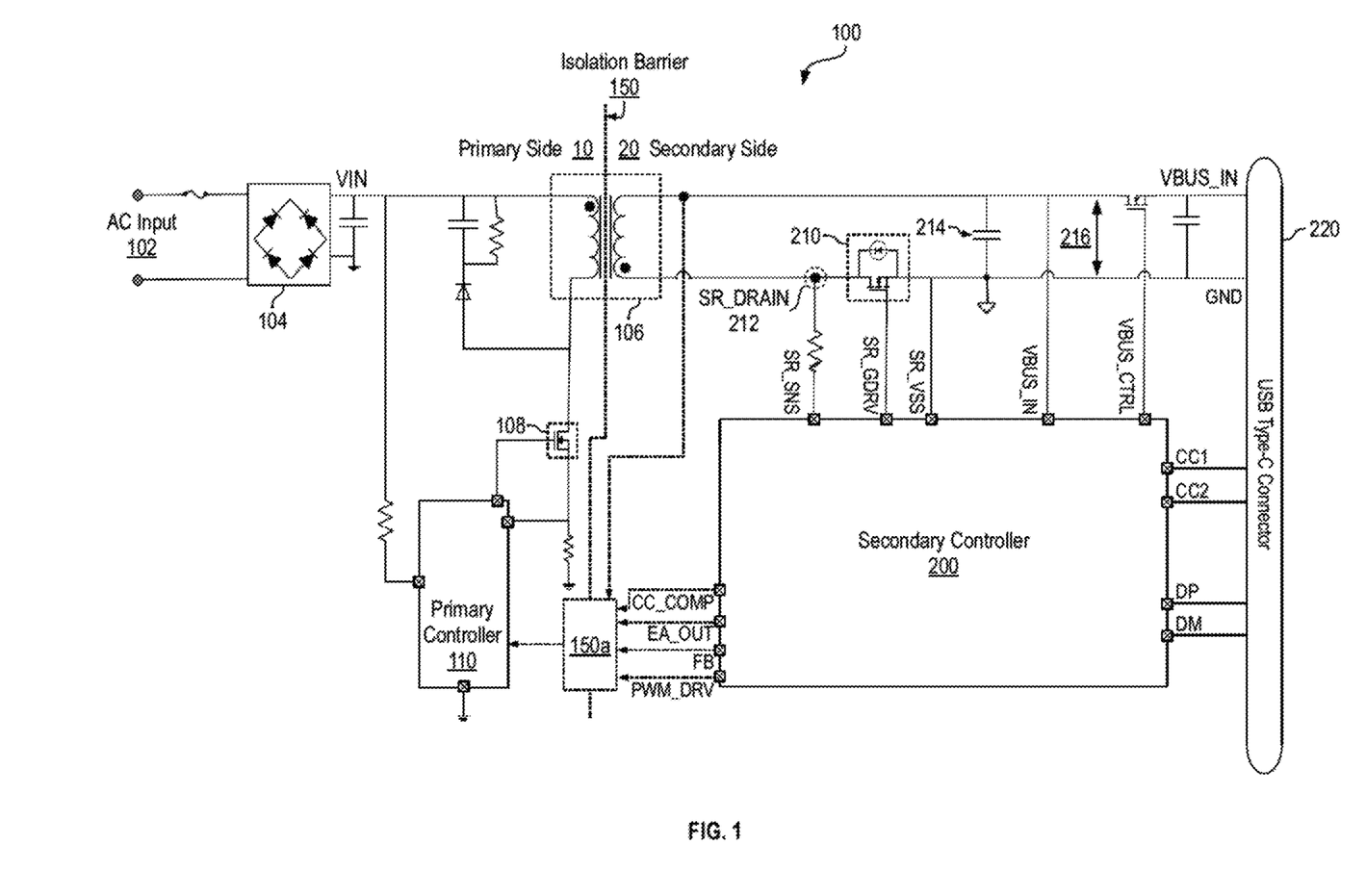
FIG. 1 illustrates a primary-controlled AC-DC converter system, in accordance with an example embodiment.

FIG. 1 illustrates a primary-controlled AC-DC converter 100, in accordance with some embodiments. AC-DC converter 100 is a flyback converter that provides galvanic isolation between the AC input 102 and the DC output 216. AC-DC converter 100 includes a primary side 10 disposed on the AC input side of transformer 106, and a secondary side 20 disposed on the DC output side of the transformer 106. An isolation barrier 150, with isolation element 150a, electrically isolates the primary side 10 from the secondary side 20. In primary-controlled mode, the primary side of the transformer controls the operation of the converter since the only communication channel from the primary side to the secondary side is the voltage level provided by the transformer to the secondary side. The on-cycles of the primary side and secondary side are typically separated by a time interval during which the power stored in the transformer is transferred through the rectifier diode, which causes higher power loss and thereby reduces the efficiency.

Referring to FIG. 1, the primary side 10 of AC-DC converter 100 includes AC input 102, bridge rectifier 104, transformer 106, primary power switch (PS)-field effect transistor (FET) 108, and primary controller 110. The secondary side 20 includes secondary controller 200, synchronous rectifier (SR) circuit 210, drain node (SR_DRAIN) 212, output capacitor 214, and Universal Serial Bus (USB) Type-C connector 220. On the primary side 10, AC input 102 is configured to receive alternating current from a power source, e.g., such as a wall socket (not shown in FIG. 1). Bridge rectifier 104 is coupled between AC input 102 and transformer 106 to rectify the input voltage received at AC input 102. Transformer 106 is coupled to conduct the AC current from bridge rectifier 104, through its primary coil and primary PS-FET 108, to ground. Primary controller 110 is coupled to the gate of PS-FET 108 to control the on and off cycles of transformer 106. On the secondary side 20, SR circuit 210 is coupled between the secondary coil of transformer 106 and output capacitor 214. SR circuit 210 includes a secondary PS-FET coupled in parallel to a diode, such that when the secondary PS-FET is turned on induction current flows to drain node 212. SR circuit 210 is configured to charge output capacitor 214 (in successive on and off cycles), so that the output capacitor can provide a steady voltage to DC output 216. DC output 216 is coupled to power connector 220. Secondary controller 200 is coupled to drain node 212 of SR circuit 210 to sense the voltage (and changes thereof) on the drain node. Secondary controller 200 is also coupled to the gate of the secondary PS-FET in SR circuit 210 to turn the SR circuit on and off (e.g., in respective on and off cycles) based on voltage peaks, negative voltage, and zero-voltage crossings sensed on the drain node 212.

A key element that determines the efficiency of an AC-DC converter (e.g., such as converter 100) is the operation of the secondary PS-FET switch (e.g., PS-FET 210) that controls the operation cycles of the SR circuit (e.g., SR circuit 210). In primary-controlled mode, the secondary side controller (e.g., controller 200) is completely dependent on the voltage level of the drain node (e.g., SR_DRAIN 212) of the SR circuit since there is no other communication channel from the primary side (10) to the secondary side (20). In a typical operating scenario, the voltage on the SR_DRAIN node goes below −0.2V to indicate to the secondary controller to turn on the secondary PS-FET. When the voltage on the SR_DRAIN node reaches back to 0V, the secondary side controller detects this zero-voltage crossing and turns off the secondary PS-FET.

False NSN detection is a major problem for a secondary side controller operating in the context of a primary-controlled AC-DC converter. Such false NSN detection happens during resonant ringing when the converter is operating in Discontinuous Conduction Mode (DCM). During such resonant ringing, the voltage on the SR_DRAIN node of the SR circuit can get below −200 mV. This will be wrongly interpreted by the secondary side controller as a valid NSN detection event, causing the secondary side controller to turn on the secondary PS-FET of the SR circuit. This, in turn, results in efficiency loss due to the unnecessary turning on of the SR circuit, thereby discharging the output load capacitor to ground. In addition, if the primary side controller turns on the primary PS-FET at the same time, then cross-conduction will result with both the primary side and the secondary side being on at the same time. Such cross-conduction, however, can result in very high secondary-side current, which can cause breakdown of the diode and transistor components of the SR circuit. Conventionally, blanking time may be used as a solution to this problem (e.g., blanking NSN detection for a certain time interval). Use of such blanking time, however, decreases the efficiency of the converter because the secondary PS-FET will not be turned on during this time and the diode of the SR circuit will carry the peak current thereby causing power loss.

Figure 2:
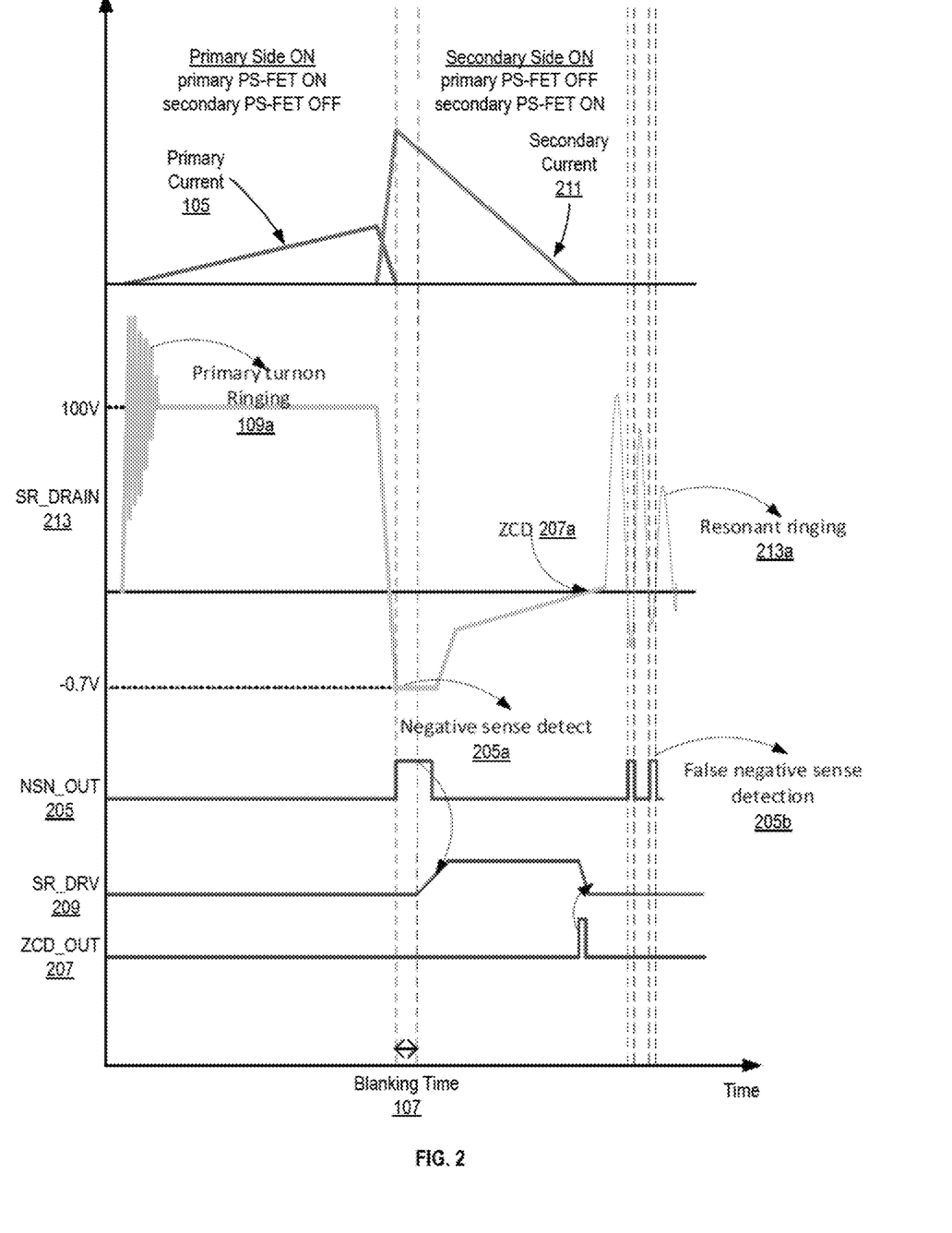
FIG. 2 illustrates a signal flow diagram for a primary-controlled AC-DC converter system.

FIG. 2 is an example signal diagram (e.g., for a primary-controlled AC-DC converter operating in DCM mode) that illustrates the false NSN detection problem. When the primary side is on (primary on-cycle), the primary PS-FET is on, the secondary PS-FET is off, and primary current 105 flows through the primary coil of the transformer. When the secondary side is on (secondary on-cycle), the primary PS-FET is off, the secondary PS-FET is on, and secondary current 211 flows to the drain node of the SR circuit. As illustrated in FIG. 2, the primary on-cycle and the secondary on-cycle are separated by blanking time interval 107 in a conventional manner.

When the primary side is turned on, a leakage ringing event 109$a$ is effectuated on the SR_DRAIN signal 213. When the voltage on the SR_DRAIN signal 213 drops to approximately 0.7V, a true NSN event 205$a$ can be detected based on the output NSN signal (NSN_OUT) 205 at the end of the blanking time interval 107. After the blanking time interval 107, the primary side is turned off and the secondary side is turned on. The detection of the true NSN event 205$a$ is used to drive high the control signal SR_DRV 209, which turns on the secondary PS-FET. As a result, the voltage on the SR-DRAIN signal rises and eventually crosses 0V. When this happens, a zero-crossing detection (ZCD) event 207$a$ can be detected based on the control signal ZCD_OUT 207, and the control signal SR_DRV 209 is driven low to turn off the secondary PS-FET. However, after ZCD event 207$a$, the voltage on the SR_DRAIN signal 209 continues to rise and effectuates resonant ringing 213$a$ thereon. This causes a false NSN detection event 205$b$ to be detected on the SR_DRAIN signal 213 based on the NSN_OUT signal 205. The detection of this (false) NSN event 205$b$ is used to drive high the control signal SR_DRV 209, which unnecessarily (i.e., faultily) turns on the secondary PS-FET.

In order to prevent such faulty turn-on of the secondary PS-FET, the techniques described herein provide for detecting the real, true turn-on event of the primary side and to avoid false NSN detection. For example, the techniques described herein provide for detecting high frequency ringing on the secondary-side SR drain node, which happens only when the primary side PS-FET is truly turned on. As described below with respect to FIGS. 3 and 4, the frequency of this ringing is much higher than the frequency of the resonant ringing caused by a false NSN event. Thus, an AC-DC converter configured in accordance with the techniques described herein can distinguish between a real and a false NSN detection event.

Figure 3:
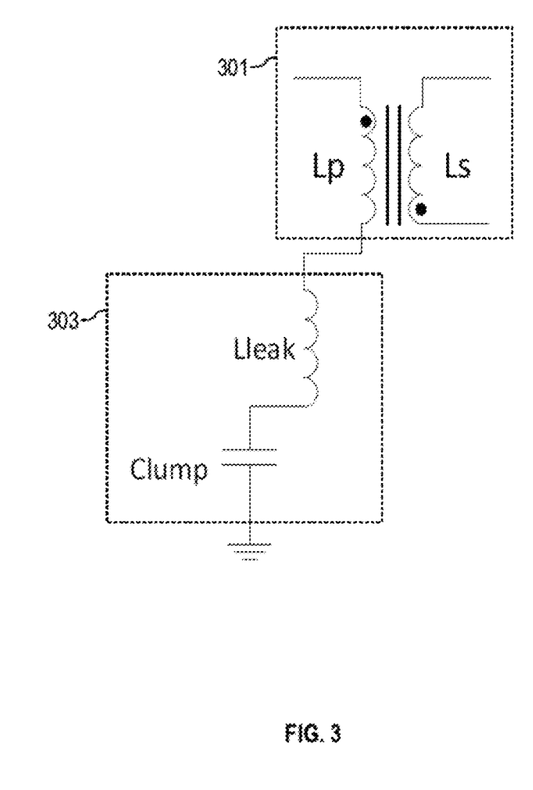
FIG. 3 illustrates a schematic diagram of a capacitance model for a transformer in an AC-DC converter system, according to some embodiments.

FIG. 3 illustrates a schematic diagram of a capacitance model for a transformer in an AC-DC converter. In FIG. 3, a transformer 301 is illustrated as being coupled to parasitic elements 303 that cause parasitic ringing on the SR_DRAIN node of the SR circuit on the secondary side. For example, the interwinding capacitance of transformer 301 along with the capacitances of different elements connected to the AC-DC converter can be collectively modeled as the parasitic capacitance Clump. The leakage energy from the primary side to the secondary side due to imperfect coupling is shown as leakage inductance Lleak. The leakage inductance Lleak along with the parasitic capacitance Clump creates an oscillatory behavior (e.g., inductance ringing) on the SR_DRAIN node whenever the primary PS-FET switch is turned on. The frequency f leak of the inductance ringing is expressed as Equation (1) below:

$$fleak = \frac{1}{2\pi\sqrt{Lleak * Clump}} \quad (1)$$

Similarly, whenever the energy in the transformer goes to zero, there is resonant ringing on the SR_DRAIN node in the secondary side. The frequency f dcm of this resonant ringing is expressed as Equation (2) below:

$$fdcm = \frac{1}{2\pi\sqrt{(Lp + Lleak) * Clump}} \quad (2)$$

where Lp is the inductance of the primary coil of the transformer.

Figure 4:
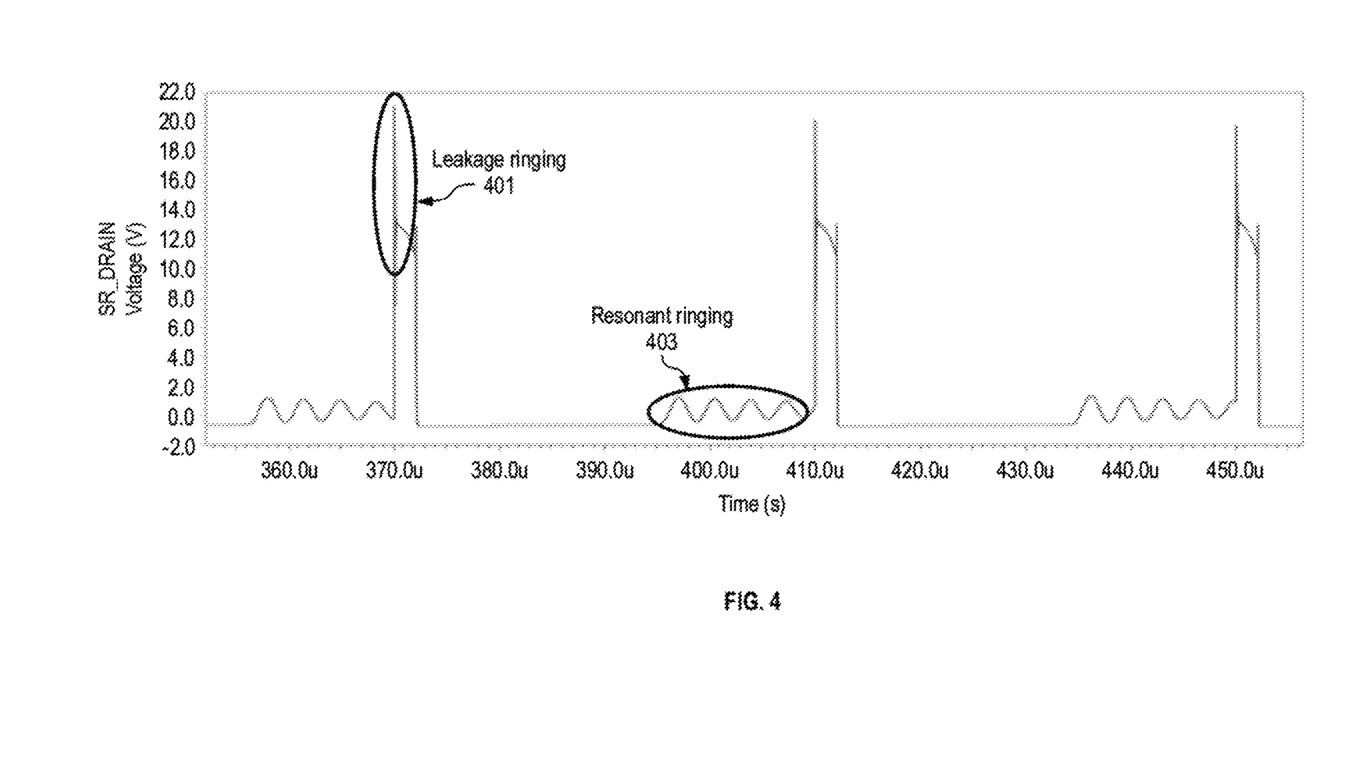
FIG. 4 illustrates a waveform diagram for a secondary side in an AC-DC converter system, according to some embodiments.

Typically, the leakage inductance Lleak is very small (e.g., less than 2%) compared to the primary inductance Lp. Hence, based on Equations (1) and (2), it can be observed that the leakage frequency f leak of the inductance ringing is very high compared to the frequency f dcm of the resonant ringing. The big difference between the leakage frequency f leak and the resonant ringing frequency f dcm is used by the techniques described herein to detect the real primary side turn-on events and to distinguish between real and false NSN detection events. This is illustrated in FIG. 4, which shows a waveform diagram of the voltage signal on the drain node (SR_DRAIN) of the SR circuit on the secondary side of an AC-DC converter. As shown in FIG. 4, the frequency of the inductance leakage ringing 401 is much higher than the frequency of the resonant ringing 403.

According to the techniques described herein, the frequency of the ringing on the SR_DRAIN node of the SR circuit is measured in every cycle on the secondary side of an AC-DC converter. When the measured frequency is much higher (e.g., by at least a threshold amount) than the expected resonant frequency, a signal is generated to enable the NSN detection on the SR_DRAIN node. This effectively distinguishes the real NSN event from a false NSN event, thereby eliminating the false turn on of the secondary PS-FET.

Figure 5:
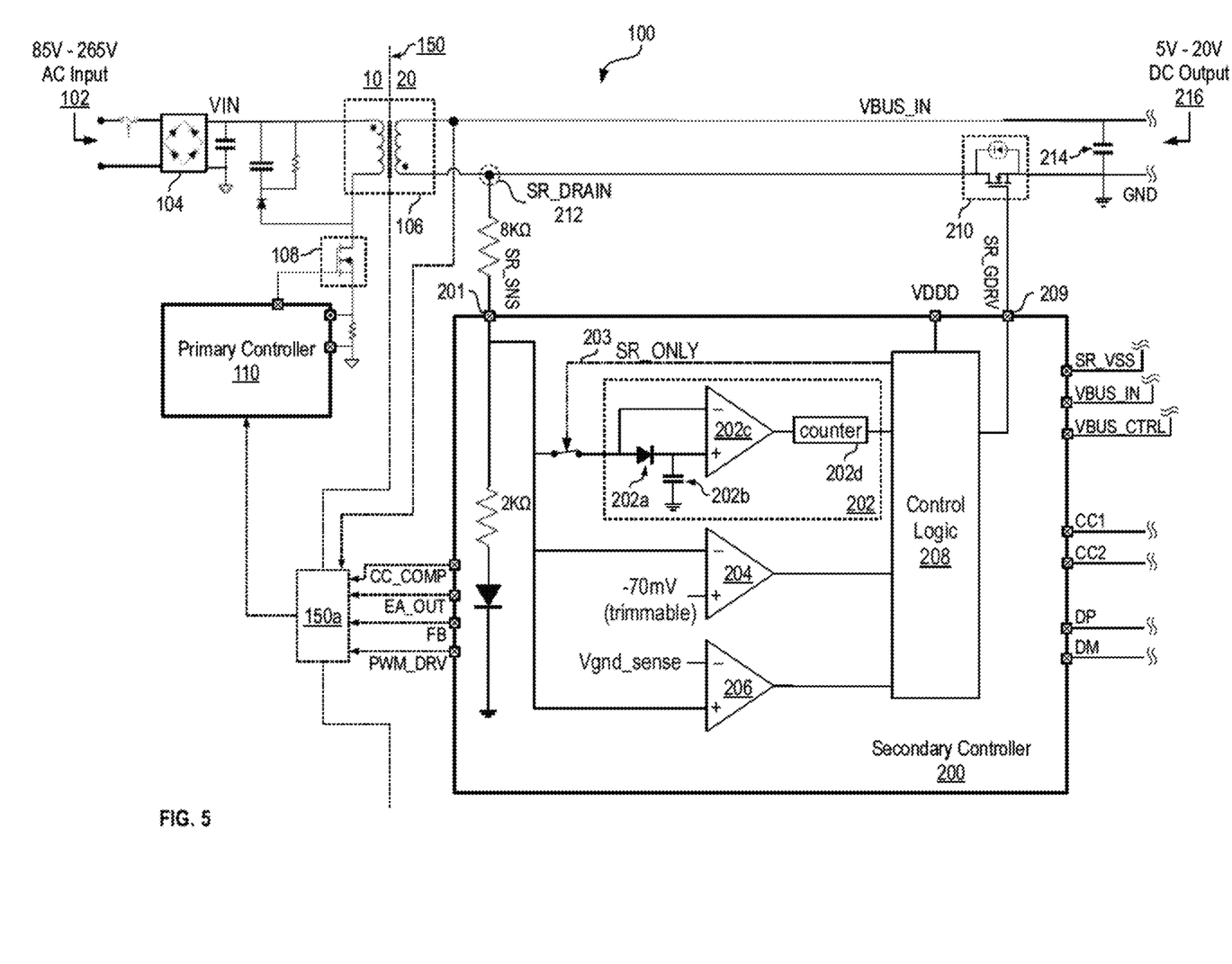
FIG. 5 illustrates an example primary-controlled AC-DC converter system, in accordance with some embodiments.

FIG. 5 illustrates a converter 100 (e.g., such as the AC-DC converter 100 of FIG. 1) that is configured in accordance with the techniques described herein for avoiding false NSN detection events. In FIG. 5, AC-DC converter 100 is a flyback converter that provides galvanic isolation between AC input 102 and DC output 216. Converter 100 is a primary-controlled AC-DC converter that operates in DCM mode. The various components of converter 100 may be disposed, and coupled to each other, on one or more substrates (e.g., as printed circuit boards, PCBs) that are encapsulated in a suitable housing. For example, in some embodiments AC-DC converter 100 may be a power supply converter disposed within an electronic device. In other embodiments, AC-DC converter may be a standalone power supply for a portable electronic device.

Referring to FIG. 5, converter 100 includes primary side 10, isolation barrier 150, and secondary side 20. The primary side 10 controls the operation of converter 100 since the only communication channel from the primary side 10 to the secondary side 20 is the voltage level provided by transformer 106 to the secondary side.

Among other components, the primary side 10 of converter 100 includes AC input 102, bridge rectifier 104, transformer 106, primary PS-FET 108, and primary controller 110. AC input 102 is configured for coupling to a power source (e.g., such as a wall socket) that provides an AC voltage in the range of 85V to 265V. Bridge rectifier 104 is coupled to receive input voltage from AC input 102 and to provide a rectified output voltage (VIN) to the primary coil of transformer 106. The primary coil of transformer 106 is coupled to conduct the current from bridge rectifier 104, through primary PS-FET 108, to ground. PS-FET 108 is a power switch that can be implemented as one or more metal-oxide-semiconductor field-effect transistors (MOSFETs) or other suitable high-voltage/power semiconductor devices. Primary controller 110 is coupled to the gate of PS-FET 108 to control the on and off cycles of transformer 106. In some embodiments, primary controller 110 may be implemented as a single-chip integrated circuit (IC) controller manufactured on a semiconductor die. In other embodiments, primary controller 110 may be a single-chip IC that is manufactured as a System-on-Chip (SoC). In yet other embodiments, primary controller 110 may be a multi-chip module encapsulated in a single semiconductor package.

An isolation barrier 150, including isolation element 150a, is disposed between primary side 10 and secondary side 20 to electrically isolate the primary side from the secondary side. Isolation element 150a is an electronic circuit that is coupled to one or more input pins of primary controller 110, to the VBUS_IN line on the secondary side 20, and to one or more output pins of secondary controller 200. Isolation element 150a is configured to provide non-galvanic feedback signal(s) to primary controller 110 in order to control the voltage level that is output on the VBUS line by transformer 106.

For example, in some embodiments the isolation element 150a may be an opto-isolator circuit. The opto-isolator circuit includes a light-emitting element, such as a light emitting diode (LED), and a light-sensitive element such as a phototransistor. The LED has an anode coupled to the VBUS_IN line on the secondary side 20 through a voltage divider, and a cathode that is coupled directly to an error amplifier output (EA_OUT) pin of secondary controller 200. The cathode of the LED is also coupled to a feedback (FB) pin and to a constant current compensation (CC_COMP) pin of secondary controller 200, through one or more resistor-capacitor networks. The phototransistor of the opto-isolator circuit is coupled to an input pin of primary controller 110 and is configured (e.g., within a suitable housing) to receive light signals emitted from the LED. In operation, secondary controller 200 uses the output signal from its EA_OUT pin to drive the LED to provide an optical feedback signal regarding the voltage on the VBUS_IN line. The optical feedback signal is provided to the primary controller 110 over the phototransistor in opto-isolator element 150a. The primary controller 110 uses the received feedback signal to control the length of the on-cycle of primary side 10, thereby controlling the level of the voltage that is output by the secondary coil of transformer 106 to the VBUS_IN line on secondary side 20.

In another example, in some embodiments the isolation element 150a may be a pulse transformer circuit. The pulse transformer circuit includes a pulse transformer coupled between a pulse width modulation drive (PWM_DRV) pin of secondary controller 200 and an input pin of primary controller 110. The signal output on the PWM_DRV pin of secondary controller 200 reflects the voltage on the VBUS_IN line on the secondary side 20. In operation, the signal output on the PWM_DRV pin is provided to the primary coil of pulse transformer, which induces a corresponding signal (to the secondary coil of the pulse transformer) that is provided as a feedback signal to primary controller 110. The primary controller 110 uses the pulse width of the received feedback signal to operate the primary PS-FET 108 and to control the length of the on-cycle of primary side 10, thereby controlling the level of the voltage that is output by the secondary coil of transformer 106 to the VBUS_IN line on secondary side 20.

Among other components, the secondary side 20 of converter 100 includes secondary controller 200, synchronous rectifier (SR) circuit 210, drain node (SR_DRAIN) 212, and output capacitor 214. SR circuit 210 is coupled between the secondary coil of transformer 106 and output capacitor 214. SR circuit 210 includes a secondary PS-FET coupled in parallel to a diode, such that when the secondary PS-FET is turned on induction current flows to drain node 212. The secondary PS-FET in SR circuit 210 is a power switch that can be implemented as one or more MOSFETs or other suitable high-voltage/power semiconductor devices. The drain node 212 of SR circuit 210 is coupled to input pin (e.g., terminal) 201 of secondary controller 200, and the gate of secondary PS-FET in the SR circuit is coupled to output pin 209 of the secondary controller.

Secondary controller 200 is configured to sense the voltage (and changes thereof) at drain node 212. Secondary controller 200 is also configured to control the gate of the secondary PS-FET of SR circuit 210 by providing a control signal (SR_GDRV) on its output pin 209. In some embodiments, secondary controller 200 may be implemented as a single-chip IC controller manufactured on a semiconductor die. In other embodiments, secondary controller 200 may be a single-chip IC that is manufactured as a System-on-Chip (SoC). In yet other embodiments, secondary controller 200 may be a multi-chip module encapsulated in a single semiconductor package.

Under the control of secondary controller 200, SR circuit 210 operates to charge output capacitor 214 in successive on and off cycles. Output capacitor 214 is configured to operate as a filter that provides a DC voltage to DC output 216. For example, during the on-cycle of primary side 10 and the off-cycle of secondary side 20 (e.g., when PS-FET 108 is closed and the secondary PS-FET in SR circuit 210 is open), a magnetic field builds up in transformer 106 while a current on the primary side 10 increases linearly. During the off-cycle of primary side 10 and the on-cycle of secondary side 20 (e.g., when PS-FET 108 is opened and the secondary PS-FET in SR circuit 210 is closed), the magnetic field built up in transformer 106 begins to collapse and a current is induced in the secondary coil of the transformer as power is transferred to output capacitor 214. During the secondary side on-cycle, the current in secondary side 20 decreases steadily, but gradually, until a point is reached at which there is substantially zero current flow through drain node 212. In this manner, output capacitor 214 is charged in successive cycles to provide a steady DC voltage to DC output 216.

DC output 216 is coupled to supply a DC voltage to an electronic device or other load. For example, in some embodiments the nominal DC voltage provided on DC output 216 may be in the range of 3.3V (or 5V) to 20V. Further, in some embodiments DC output 216 may be coupled as an internal power supply of an electronic device. In other embodiments, DC output 216 may be coupled to a power connector (not shown in FIG. 5) for providing power to a portable electronic device. In one such embodiment (e.g., as illustrated in FIG. 1), the power connector may be a USB Type-C connector (220) configured according to the USB Type-C specification. The USB Type-C specification defines a Type-C receptacle, a Type-C plug, and Type-C cables that can support USB communications as well as power delivery (PD) over protocols defined in various revisions/versions of the USB-PD specification. According to the USB Type-C specification, a Type-C connector port (e.g., a Type-C receptacle or Type-C plug) provides a VBUS power line, DP (D+) and DM (D−) data lines, and a GND ground return line, among others. In addition, a Type-C connector port also provides two Configuration Channel lines (CC1 and CC2) for discovery, configuration, and management of connections across a Type-C cable. As illustrated in the embodiment of FIG. 1, USB Type-C connector 220 provides a VBUS line (VBUS_IN), a GND line, CC1 and CC2 lines, and DP and DM data lines. The VBUS_IN line is coupled to a respective input pin of secondary controller 200 to provide a power signal (VBUS_IN), while the GND line is coupled to a respective pin of the secondary controller to provide a control signal (SR_VSS) from the source node of SR circuit 210. The VBUS_IN line includes a power switch that is implemented as an on/off semiconductor device controlled by a control signal (VBUS_CTRL) provided from an output pin of secondary controller 200. The CC1, CC2, DP, and DM lines of USB Type-C connector 220 are coupled to respective pins of secondary controller 200.

Referring back to FIG. 5, secondary controller 200 in AC-DC converter 100 is configured in accordance with the techniques described herein for avoiding false NSN detection. Secondary controller 200 comprises control logic 208, which is coupled to receive power from an external source through a power pin (VDDD). As used herein, "logic" refers to a hardware block having one or more circuits that include various electronic components configured to process analog and/or digital signals and to perform one or more operations in response to control signal(s). Examples of such electronic components include, without limitation, transistors, diodes, resistors, capacitors, inductors, logic gates, and various circuits thereof. Control logic 208 is coupled to provide a control signal (SR_GDRV) through pin 209 to SR circuit 210. The control signal SR_GDRV is applied to the gate of the PS-FET in SR circuit 210 to turn the SR circuit on and off. Control logic 208 may also include circuitry for receiving a high-frequency clock signal that is used as a reference to determine when the frequency of the signal from the SR_DRAIN node 212 is above a pre-determined frequency threshold value.

Secondary controller 200 also comprises frequency detector 202, negative voltage detector 204, and zero-voltage detector 206 that are coupled to SR_DRAIN node 212 through pin 201. A voltage divider, with an 8K external resistor and a 2K internal resistor, is coupled at input pin 201 to generate a voltage-divided input signal (SR_SNS) that is provided to frequency detector 202, negative voltage detector 204, and zero-voltage detector 206. The output terminals of frequency detector 202, negative voltage detector 204, and zero-voltage detector 206 are coupled to control logic 208.

Frequency detector 202 (also referred to as "peak detector") is a circuit that includes a diode 202*a*, reference capacitor 202*b*, high-speed comparator 202*c*, and digital counter 202*d*. Frequency detector 202 may also include a control terminal (not shown in FIG. 5) that is coupled to receive an enable signal from control logic 208. Reference capacitor 202*b* is coupled between diode 202*a* and the non-inverting terminal of comparator 202*c*. The inverting terminal of comparator 202*c* is coupled to receive the SR_SNS input signal from SR_DRAIN node 212. Diode 202*a* is also coupled to receive the SR_SNS input signal. Counter 202*d* may be a register or other element suitable for storing a digital count. Frequency detector 202 is configured to detect the peak point of any oscillating signal on SR_DRAIN node 212, and the difference between two consecutive peaks can be used to determine the frequency of oscillation. For example, comparator 202c outputs a high signal to counter 202d, and the counts stored in counter 202d are used by control logic 208 to determine the frequency on the SR_SNS input signal from SR_DRAIN node 212.

In some embodiments, secondary controller 200 may include hardware components that can operate in both primary-controlled mode and secondary-controlled mode. In secondary-controlled mode, AC-DC converter 100 further includes electronic components (e.g., such as an opto-isolator circuit with a light-emitting diode and a light-sensitive phototransistor, or a pulse-width modulation (PWM) circuit with a PWM ramp generator and a pulse transformer) that provide a non-galvanic feedback path to primary controller 110, such that the secondary controller 200 can pass control signals to, and control the operation of, the primary controller. In such embodiments, in order to effectuate the primary-controlled or secondary-controlled operating modes of secondary controller 200, control logic 208 is configured to provide an enable signal (SR_ONLY) 203 to a switch that is coupled to diode 202a. In primary-controlled mode, control logic 208 continuously applies the SR_ONLY enable signal 203 to the switch, so the SR_SNS input signal is continuously provided to frequency detector 202.

Negative sense detector 204 is a circuit that includes comparator 204. The inverting terminal of comparator 204 is coupled to receive the SR_SNS input signal from SR_DRAIN node 212. The non-inverting terminal of comparator 204 is coupled to a trimmable voltage reference source (e.g., at −70 mV, or below). Negative sense detector 204 may also include a control terminal (not shown in FIG. 5) that is coupled to receive a enable signal from control logic 208. The output of negative sense detector 204 is coupled to provide an output signal to control logic 208. For example, negative sense detector 204 is configured to provide a high output signal when the negative voltage of the SR_SNS input signal goes below a certain voltage threshold value (e.g., such as −200 mV).

Zero-voltage detector 206 is a circuit that includes comparator 206. The non-inverting terminal of comparator 206 is coupled to receive the SR_SNS input signal from SR_DRAIN node 212. The inverting terminal of comparator 206 is coupled to a zero-voltage reference source, Vgnd_sense (e.g., at 0V). Zero-voltage detector 206 may also include a control terminal (not shown in FIG. 5) that is coupled to receive an enable signal from control logic 208. The output of zero-voltage detector 206 is coupled to provide an output signal to control logic 208. For example, zero-voltage detector 206 is configured to provide a high output signal when the voltage of the SR_SNS input signal reaches 0V from a previous negative voltage value.

In operation according to the techniques described herein, the frequency of the ringing on the SR_DRAIN node 212 of the SR circuit 210 is measured by frequency detector 202 and control logic 208 in every cycle on the secondary side 20 of converter 100. When the measured frequency is higher than a frequency threshold value (e.g., ten times the expected resonant frequency, or 10*f dcm), control logic 208 enables negative sense detector 204. For example, control logic 208 may apply an enable signal to negative sense detector 204 or (e.g., if the negative sense detector is configured for continuous operation) may simply turn on the output of the negative sense detector. In this manner, negative sense detector 204 is turned on only after high-frequency (e.g., inductance leakage) ringing is detected on the SR_DRAIN node 212, thereby indicating a true turn-on event of primary controller 110. When enabled, negative sense detector 204 operates to sense the negative voltage of the SR_SNS input signal from SR_DRAIN node 212. When the negative voltage of the SR_SNS input signal goes below certain voltage threshold value (e.g., −200 mV), negative sense detector 204 outputs a high signal to control logic 208. In response, control logic 208 turns on the secondary PS-FET of SR circuit 210 to transfer power to the secondary side 20 of converter 100. Thereafter (e.g., after turning the SR circuit on), control logic 208 disables negative sense detector 204 (and/or the output signal therefrom). When the voltage on the SR_DRAIN node 212 reaches back to 0V from its previous negative voltage level, zero-voltage detector 206 detects the zero-crossing event and outputs a high signal to control logic 208. In response, control logic 208 turns off the PS-FET switch in SR circuit 210 by applying the appropriate control signal SR_GDRV to output pin 209. However, since negative sense detector 204 is disabled before and during the zero-crossing event, the detection of a possible (false) NSN event by the negative sense detector is avoided.

Figure 6:
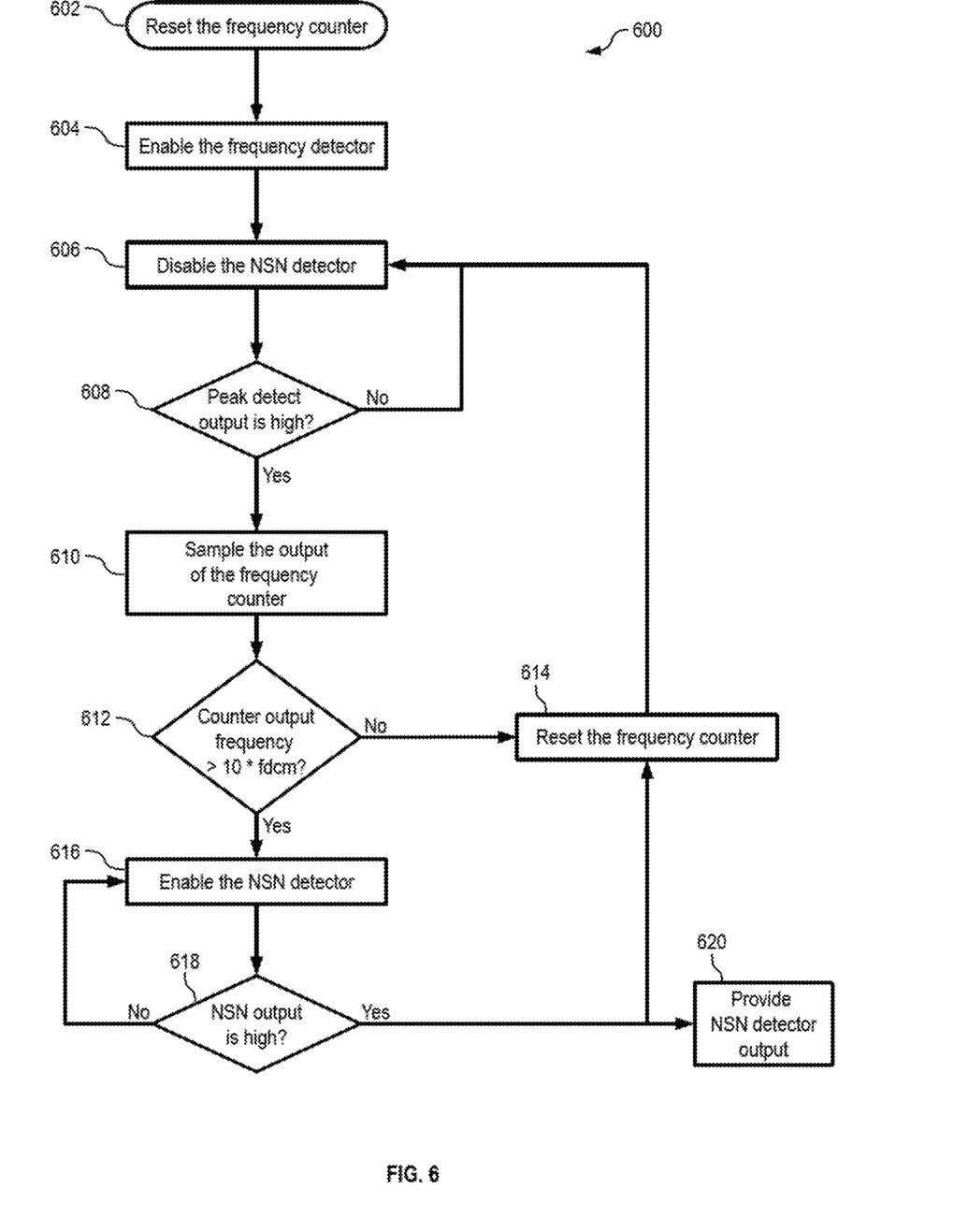
FIG. 6 illustrates an example method for avoiding false NSN detection in a primary-controlled AC-DC converter system, in accordance with some embodiments.

FIG. 6 illustrates a method 600 for avoiding false NSN detection in a primary-controlled AC-DC converter, according to an example embodiment. The operations of method 600 in FIG. 6 are described as being performed by a frequency detector, an NSN detector, and a control logic (e.g., such as frequency detector 202, negative sense detector 204, and control logic 208 of FIG. 5, respectively). It is noted, however, that various implementations and embodiments may use various, and possibly different, hardware components to perform the operations of method 600. Thus, the description of method 600 hereinafter is to be regarded in an illustrative rather than a restrictive sense.

According to the techniques described herein, method 600 is performed based on input signal from the drain node of the SR circuit on the secondary side of a primary-controlled AC-DC converter that operates in DCM mode.

In operation 602, a control logic in a secondary controller of the AC-DC converter resets a frequency counter to 0. In operation 604, the control logic enables a frequency detector and routes the output of the frequency detector to the frequency counter. In some embodiments, the secondary controller may include hardware components that can operate in both primary-controlled mode and secondary-controlled mode. In such embodiments, the primary-controlled mode is enabled within the secondary controller prior to operations 602 and 604. For example, the control logic may continuously apply an enable signal to the frequency detector in order to ensure that the secondary controller receives the input signal from the drain node of the SR circuit.

In operation 606, the control logic disables its NSN detector. For example, the control logic may apply a disable signal to the NSN detector. If the NSN detector is configured to operate continuously, the control logic may turn off its circuits that receive the output signal from the NSN detector.

In operation 608, the frequency detector determines the frequency of the input signal received from the drain node of the SR circuit, and the control logic continuously monitors the output of the frequency detector. For example, the control logic may be configured to continuously receive the output signal from a peak-detect comparator in the frequency detector. When the output of the peak-detect comparator is a low signal, the control logic proceeds with operation 606 to disable the NSN detector. However, when the output of the peak-detect comparator is a high signal, in operation 610 the control logic samples the output from the frequency counter (e.g., with 1 MHz sampling frequency).

In operation 612, the control logic compares the sampled frequency to a frequency threshold value. According to the techniques described herein, the frequency threshold value is based on the expected resonant frequency of the input signal from the drain node of the SR circuit. In some embodiments, the frequency threshold value may be equal to ten times the expected resonant frequency (e.g., 10*f_dcm), but it is noted that various embodiments may use different frequency threshold values depending on the specific type of converter and the circuits therein.

If in operation 612 the control logic determines that the sampled frequency is not greater than the frequency threshold value, the control logic resets the frequency counter to 0 in operation 614 and then proceeds with operation 606 to disable the NSN detector.

If in operation 612 the control logic determines that the sampled frequency is greater than the frequency threshold value, the control logic determines that a true turn-on event of the primary side of the AC-DC converter is detected. The control logic then proceeds with operation 616 to enable the NSN detector. For example, in response to determining that the sampled frequency is greater than the frequency threshold value, the control logic may apply an enable signal to the NSN detector to turn it on. If the NSN detector is configured to operate continuously, in operation 616 the control logic may turn on its circuits that receive the output signal from the NSN detector, in response to determining that sampled frequency is greater than the frequency threshold value.

In operation 618, the control logic monitors the output signal from the NSN detector. If the output signal from the NSN detector is low, the control logic proceeds back with operation 616 to make sure the NSN detector is still enabled.

If in operation 618 the control logic detects that the output signal from the NSN detector is high, the control logic determines that the voltage of the input signal from the drain node of the SR circuit has dropped below a certain voltage threshold value (e.g., −200 mV). This indicates to the control logic that the SR circuit needs to be turned on. Thus, in operation 620 the NSN detector output signal is provided to internal hardware circuitry (e.g., synthesized RTL) of the control logic that applies an enable signal to the gate of the PS-FET of the SR circuit to turn it on. In addition, in response to detecting that the output signal from the NSN detector is at the high level, the control logic proceeds with operation 614 to reset the frequency counter to 0 and then with operation 606 to disable the NSN detector.

In this manner, the NSN detector is enabled only after a detection of a true turn-on event of the primary side of the AC-DC converter, while remaining disabled the rest of the time. Operating the NSN detector in this manner ensures that detection of false NSN events is avoided.

Figure 7:
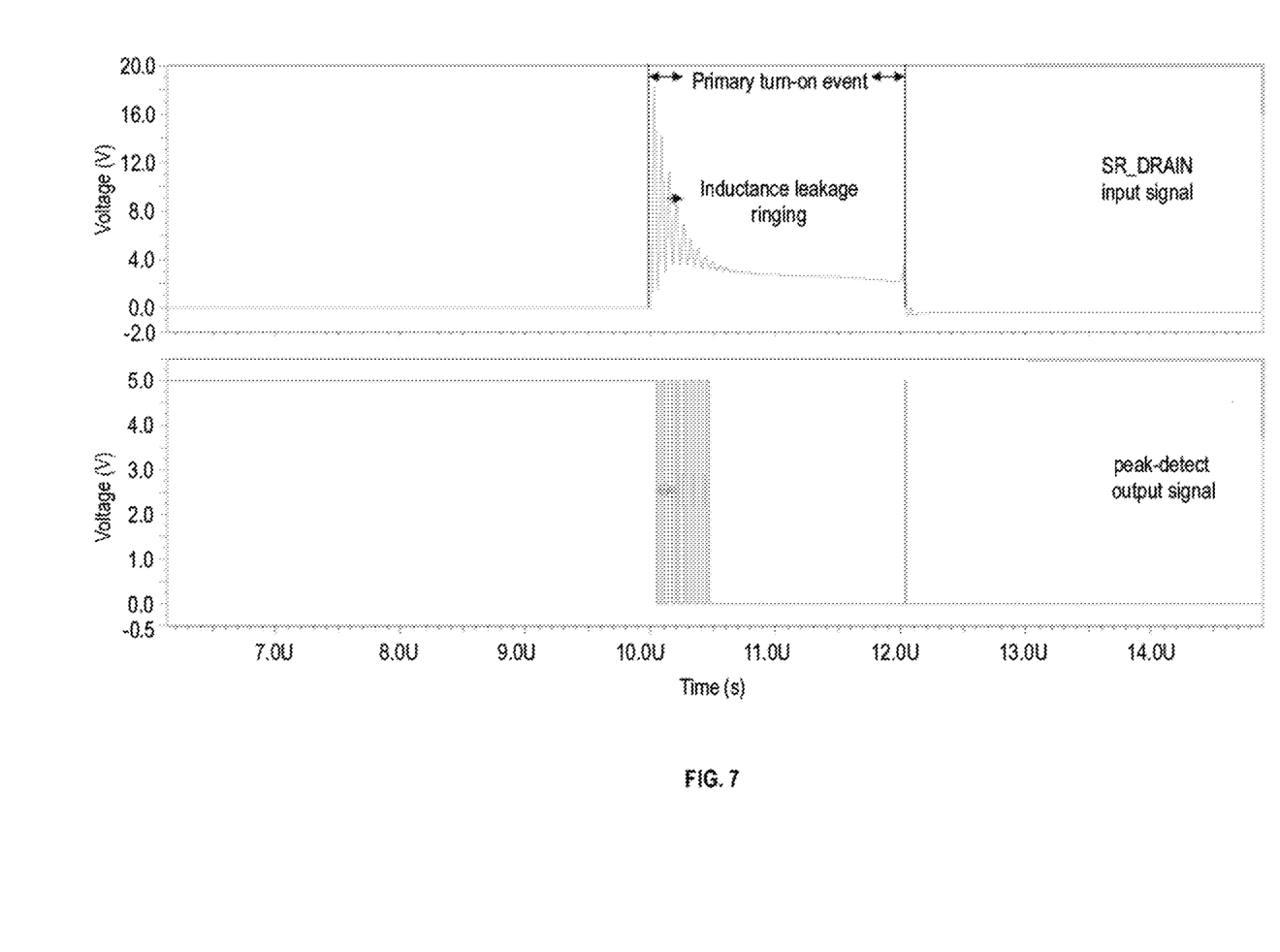
FIG. 7 illustrates a simulated result diagram for detecting high-frequency, inductance leakage ringing in an AC-DC converter system, according to some embodiments.

FIG. 7 illustrates a simulated result diagram for detecting high frequency ringing. The top portion of the diagram illustrates the inductance leakage ringing on the SR_DRAIN input signal when the primary side of an AC-DC converter is turned on. The bottom portion of the diagram illustrates the output signal from the peak-detect comparator of a frequency detector, in accordance with the techniques described herein. As can be seen in the bottom portion of the diagram, the output signal from the peak-detector can be used to detect the inductance leakage ringing on the SR_DRAIN signal, which is oscillating at 17.2 MHz.

The techniques described herein provide for detecting the true turn-on events on the primary side of an AC-DC converter, thereby improving the efficiency and avoiding false turn-ons of the PS-FET in the SR circuit on the secondary side of the converter. This is accomplished by detecting the high-frequency, inductance leakage ringing on the drain node of the SR circuit, which occurs whenever the PS-FET on the primary side is turned on. The frequency of this inductance leakage ringing is much higher than resonant ringing caused by false NSN events. Further, by detecting the true turn-on events on the primary side, the techniques described herein do not need to provide blanking time for turning off NSN detection. The techniques described herein also provide improved reliability of operation as there will not be any cross-conduction since the secondary PS-FET will not turn on during false NSN events. In addition, based on the real-primary turn-on detect signal, the secondary side of the converter can enable a feed-forward scheme to sense the VIN voltage provided to the transformer on the primary side of the converter. In turn, such voltage information can be used to alter internal parameters to optimize the converter efficiency even further.

Figure 8:
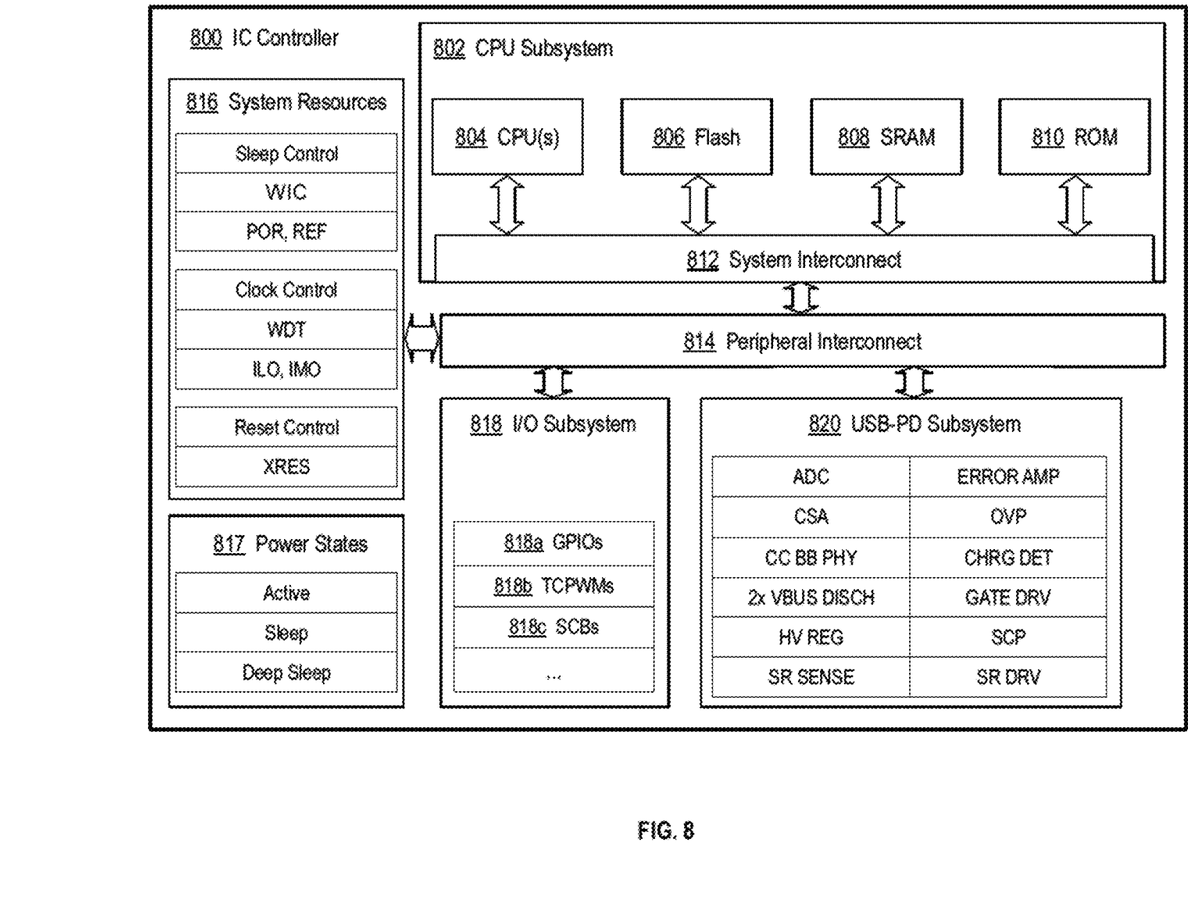
FIG. 8 illustrates an example integrated circuit (IC) controller for an AC-DC converter system, according to some embodiments.

FIG. 8 illustrates an example semiconductor device that is configured in accordance with the techniques for avoiding false NSN detection described herein. In the embodiment illustrated in FIG. 8, device 800 is a single-chip IC controller manufactured on a semiconductor die. In another example, IC controller 800 may be a single-chip IC that is manufactured as a System-on-Chip (SoC). In other embodiments, the IC controller 800 may be a multi-chip module encapsulated in a single semiconductor package. In various operational contexts, IC controller 800 may be used as the secondary controller 200 in the AC-DC converter system 100 of FIGS. 1 and 5.

Referring to FIG. 8, IC controller 800 includes CPU subsystem 802, peripheral interconnect 814, system resources 816, input/output (I/O) subsystem 818, USB-PD subsystem 820, and various terminals (e.g., pins) that are configured for receiving and sending signals.

CPU subsystem 802 includes one or more CPUs (central processing units) 804, flash memory 806, SRAM (Static Random Access Memory) 808, and ROM (Read Only Memory) 810 that are coupled to system interconnect 812. CPU 804 is a suitable processor that can operate in an IC or a SoC device. Flash memory 806 is non-volatile memory (e.g., NAND flash, NOR flash, etc.) that is configured for storing data, programs, and/or other firmware instructions. Flash memory 806 is tightly coupled within the CPU subsystem 802 for improved access times. SRAM 808 is volatile memory that is configured for storing data and firmware instructions accessed by CPU 804. ROM 810 is read-only memory (or other suitable storage medium) that is configured for storing boot-up routines, configuration parameters, and other firmware parameters and settings. System interconnect 812 is a system bus (e.g., a single-level or multi-level Advanced High-Performance Bus, or AHB) that is configured as an interface that couples the various components of CPU subsystem 802 to each other, as well as a data and control interface between the various components of the CPU subsystem and peripheral interconnect 814.

Peripheral interconnect 814 is a peripheral bus (e.g., a single-level or multi-level AHB) that provides the primary data and control interface between CPU subsystem 102 and its peripherals and other resources, such as system resources 816, I/O subsystem 818, and USB-PD subsystem 820. The peripheral interconnect 814 may include various controller circuits (e.g., direct memory access, or DMA controllers), which may be programmed to transfer data between peripheral blocks without burdening the CPU subsystem 802. In various embodiments, each of the components of the CPU subsystem and the peripheral interconnect may be different with each choice or type of CPU, system bus, and/or peripheral bus.

System resources 816 include various electronic circuits that support the operation of IC controller 800 in its various states and modes. For example, system resources 816 may include a power subsystem having analog and/or digital circuits required for each controller state/mode such as, for example, sleep control circuits, wake-up interrupt controller (WIC), power-on-reset (POR), voltage and/or current reference (REF) circuits, etc. In some embodiments, the power subsystem may also include circuits that allow IC controller 800 to draw and/or provide power from/to external sources with several different voltage and/or current levels and to support controller operation in several power states 817 (e.g., such as active state, sleep state, and a deep sleep state with clocks turned off). Further, in some embodiments the CPU subsystem 802 may be optimized for low-power operation with extensive clock gating and may include various internal controller circuits that allow the CPU to operate in the various power states 817. For example, the CPU may include a wake-up interrupt controller that is configured to wake the CPU from a sleep state, thereby allowing power to be switched off when the IC chip is in the sleep state. System resources 816 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. System resources 816 may also include analog and/or digital circuit blocks that provide reset control and support external reset (XRES).

I/O subsystem 818 includes several different types of I/O blocks and subsystems. For example, I/O subsystem 818 includes GPIO (general purpose input output) blocks 818a, TCPWM (timer/counter/pulse-width-modulation) blocks 818b, and SCBs (serial communication blocks) 818c. GPIOs 818a include analog and/or digital circuits configured to implement various functions such as, for example, pull-ups, pull-downs, input threshold select, input and output buffer enabling/disabling, multiplex signals connected to various I/O pins, etc. TCPWMs 818b include analog and/or digital circuits configured to implement timers, counters, pulse-width modulators, decoders and various other analog/mixed signal elements that are configured to operate on input/output signals. SCBs 818c include analog and/or digital circuits configured to implement various serial communication interfaces such as, for example, I²C, SPI (serial peripheral interface), UART (universal asynchronous receiver/transmitter), CAN (Controller Area Network) interface, CXPI (Clock eXtension Peripheral Interface), etc.

USB-PD subsystem 820 provides the interface to a power connector such a USB Type-C port. As used herein, "USB-PD subsystem" refers to one or more logic blocks and other analog/digital hardware circuitry, which may be controllable by firmware and which is configured and operable to perform the functions and to satisfy the requirements specified in at least one release of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables (e.g., up to 5 A of current at up to 20V, for a total of up to 100 W of power). The USB-PD specification also defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging).

Among other circuitry, USB-PD subsystem 820 may include: one or more analog-to-digital convertors (ADCs) for converting various analog signals to digital signals; an error amplifier (ERROR AMP) for controlling the power source voltage applied to the VBUS line per a PD contract; a current sense amplifier (CSA) and an over-voltage protection (OVP) circuits for providing over-current and over-voltage protection on the VBUS line with configurable thresholds and response times; a communication channel PHY (CC BB PHY) logic for supporting communications on a Type-C Communication Channel (CC) line; a charge detector logic block (CHRG DET) connected to the DP and DM lines for detecting conventional battery chargers conforming to various standard and proprietary battery charging specifications; at least two on-die discharge (VBUS DISCH) circuits that can discharge a VBUS line voltage to any of range of programmable voltage levels; one or more gate drivers (GATE DRV) for controlling the power switches that turn on and off the provision of power over the VBUS line; a high voltage regulator (HV REG) for converting the power supply voltage to the precise voltage (e.g., 3-5V) needed to power IC controller 800; and a short circuit protection block (SCP) for additional short circuit detection across an external resistor coupled on the ground return path.

In accordance with the techniques for avoiding false NSN detection described herein, USB-PD subsystem 820 includes a SR sense logic block (SR SENSE) and a SR driver logic block (SR_DRV). According to the techniques described herein, the SR sense logic block includes: a frequency detector for determining the frequency on an input signal from the drain node of the SR circuit of a AC-DC converter; a negative sense detector for providing a high output signal when the negative voltage on the drain node of the SR circuit goes below a certain voltage threshold value; and a ZCD detector for providing a high output signal when the voltage on the drain node of the SR circuit reaches 0V from a previous negative voltage value. The SR driver logic block includes control logic that is configured to drive the gate of the PS-FET of the SR circuit based on signals from the frequency detector, the negative sense detector, and the ZCD detector, in accordance with the techniques described herein.

Various embodiments of the techniques described herein, for avoiding false NSN detection in flyback AC-DC converters, may include various operations. These operations may be performed and/or controlled by hardware components, digital hardware and/or firmware, and/or combinations thereof. As used herein, the term "coupled to" may mean connected directly or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C power supply architecture described herein. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An integrated circuit (IC) controller for a secondary side of an alternating current (AC)-direct current (DC) converter, the IC controller comprising:
    a terminal to receive an input signal from a drain node of a synchronous rectifier (SR) circuit on the secondary side of the AC-DC converter;
    a frequency detector configured to determine a frequency of the input signal from the drain node of the SR circuit;
    a negative sense detector configured to determine a negative voltage of the input signal from the drain node of the SR circuit; and
    a control logic configured to:
        enable the negative sense detector, when the frequency of the input signal rises above a frequency threshold value; and
        turn on the SR circuit to transfer power to the secondary side of the AC-DC converter, when the negative voltage of the input signal falls below a voltage threshold value.

2. The IC controller of claim 1, wherein the control logic is configured to detect that a primary side of the AC-DC converter is turned on when the frequency of the input signal rises above the frequency threshold value.

3. The IC controller of claim 1, wherein the control logic is configured to disable the negative sense detector when the negative voltage of the input signal falls below the voltage threshold value.

4. The IC controller of claim 1, further comprising a zero-voltage detector configured to output a high signal when a voltage of the input signal rises above 0V.

5. The IC controller of claim 4, wherein the control logic is configured to turn off the SR circuit in response to receiving the high signal from the zero-voltage detector.

6. The IC controller of claim 1, wherein the AC-DC converter is configured to operate in discontinuous conduction mode (DCM).

7. The IC controller of claim 1, wherein the AC-DC converter is configured to operate in primary-controlled mode.

8. The IC controller of claim 7, wherein the control logic is configured to apply an enable signal to operate the frequency detector in the primary-controlled mode.

9. A method of operating a secondary side controller for an alternating current (AC)-direct current (DC) converter in discontinuous conduction mode (DCM), the method comprising:
    receiving an input signal from a drain node of a synchronous rectifier (SR) circuit on a secondary side of the AC-DC converter;
    determining a frequency of the input signal from the drain node of the SR circuit;
    when the frequency of the input signal rises above a frequency threshold value, performing operations comprising:
        determining a negative voltage of the input signal; and
        turning on the SR circuit to transfer power to the secondary side of the AC-DC converter, when the negative voltage of the input signal falls below a voltage threshold value.

10. The method of claim 9, further comprising detecting that a primary side of the AC-DC converter is turned on when the frequency of the input signal rises above the frequency threshold value.

11. The method of claim 9, further comprising disabling determination of the negative voltage of the input signal when the negative voltage of the input signal falls below the voltage threshold value.

12. The method of claim 9, further comprising forgoing determination of the negative voltage of the input signal when the frequency of the input signal is at or below the frequency threshold value.

13. The method of claim 9, further comprising:
    detecting when the input signal rises above 0V; and
    turning off the SR circuit in response to detecting that the input signal has risen above 0V.

14. The method of claim 9, further comprising enabling the determining of the frequency of the input signal.

15. An alternating current (AC)-direct current (DC) converter system configured to operate in discontinuous conduction mode (DCM), the system comprising:
    a transformer coupled to receive a rectified AC input;
    a primary side integrated circuit (IC) controller coupled to control operation of the transformer;
    a connector coupled to an output capacitor that provides a DC output;
    a synchronous rectifier (SR) circuit coupled between the output capacitor and the transformer; and
    a secondary side IC controller coupled to control operation of the SR circuit, wherein the secondary side IC controller comprises:
        a terminal coupled to receive an input signal from a drain node of the SR circuit;

a frequency detector configured to determine a frequency of the input signal from the drain node of the SR circuit;

a negative sense detector configured to determine a negative voltage of the input signal from the drain node of the SR circuit; and a control logic configured to:
   enable the negative sense detector, when the frequency of the input signal rises above a frequency threshold value; and
   turn on the SR circuit to transfer power to the output capacitor, when the negative voltage of the input signal falls below a voltage threshold value.

16. The system of claim 15, wherein the secondary side IC controller further comprises a zero-voltage detector configured to output a high signal when a voltage of the input signal rises above 0V, and wherein the control logic is further configured to turn off the SR circuit in response to receiving the high signal from the zero-voltage detector.

17. The system of claim 15, wherein the rectified AC input is generated from an AC voltage in the range of 85V to 265V.

18. The system of claim 15, wherein the DC output provides a nominal DC voltage in the range of 3.3V to 20V.

19. The system of claim 15, wherein the connector is a Universal Serial Bus (USB) Type-C connector.

20. The system of claim 15, wherein the system is one of:
   a power supply converter disposed within an electronic device; and
   a power supply converter for a portable electronic device.

* * * * *